(12) United States Patent
Seth et al.

(10) Patent No.: US 8,238,526 B1
(45) Date of Patent: Aug. 7, 2012

(54) VOICEMAIL OUTBOX

(75) Inventors: Rohan Seth, Palo Alto, CA (US); Hy Murveit, Portola Valley, CA (US); Michael J. LeBeau, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1073 days.

(21) Appl. No.: 12/060,225

(22) Filed: Mar. 31, 2008

(51) Int. Cl.
*H04M 1/64* (2006.01)

(52) U.S. Cl. ............... 379/88.11; 379/88.22; 379/88.13; 379/88.17; 707/10; 709/206

(58) Field of Classification Search ............. 379/67.1, 379/88.13, 88.22, 88.17; 707/10; 709/206
See application file for complete search history.

(56) References Cited

U.S. PATENT DOCUMENTS

| | | | |
|---|---|---|---|
| 6,697,458 B1 | 2/2004 | Kunjibettu | |
| 6,879,665 B1* | 4/2005 | Cook et al. | 379/67.1 |
| 6,987,840 B1* | 1/2006 | Bosik et al. | 379/88.17 |
| 7,023,968 B1* | 4/2006 | Silvester | 379/88.13 |
| 7,185,058 B2* | 2/2007 | Blackwell et al. | 709/206 |
| 7,286,650 B2 | 10/2007 | Pantana et al. | |
| 2003/0142799 A1* | 7/2003 | Candell et al. | 379/88.13 |
| 2003/0147512 A1* | 8/2003 | Abburi | 379/88.22 |
| 2005/0232402 A1* | 10/2005 | Greve | 379/88.22 |
| 2006/0265389 A1* | 11/2006 | Yamahata et al. | 707/10 |
| 2007/0286356 A1* | 12/2007 | Goel et al. | 379/67.1 |

* cited by examiner

*Primary Examiner* — Fan Tsang
*Assistant Examiner* — Van D Huynh
(74) *Attorney, Agent, or Firm* — Fish & Richardson P.C.

(57) ABSTRACT

The subject matter of this specification can be embodied in, among other things, a method that includes receiving a voicemail message from a first telephone user for a second telephone user; providing, for display in a messaging inbox of the second telephone user, the voicemail message or information used to retrieve the voicemail message; and providing the voicemail message or information used to retrieve the voicemail message in a messaging outbox of the first telephone user, wherein the messaging outbox is formatted to display to the first telephone user a plurality of messages sent by the first telephone user.

20 Claims, 9 Drawing Sheets ically produce an audible or visual identifier to the caller and provide the caller with an opportunity to leave a voicemail or alternatively contact the system can contact the system.

VOICEMAIL OUTBOX

TECHNICAL FIELD

This document relates to telephony, and more particularly to call processing.

BACKGROUND

Voice messages are a daily part of business and everyday life. Even with mobile communication, people often miss each others' calls. Voicemail technology allows users to transmit audio messages. Some voicemail systems allow a recipient of a message to save a message for extended periods of time. Generally, to leave a voice mail message, a caller dials a callee with a telephone, a system associated with the callee (but typically not with the caller) senses that the callee has not answered the call (or the callee has previously indicated that all calls should be declined) and interacts with the caller to accept a message from the caller, store it digitally, and index it with other messages for the callee. The callee may later listen to the message, such as on a computer or their own telephone.

SUMMARY

This document describes techniques for organizing voice mail messages to make them available to various users of a telephony system. For example, in addition to storing incoming messages for users, the techniques described here also store outgoing messages for other users. Moreover, the outgoing messages (which would correspond to incoming messages for other users of a common system) may be marked and organized in a manner so that they may appear with other outgoing messages for that user in a unified manner. For example, a unified messaging application may show e-mail messages, voice mail messages, and text messages all together, with a "sent box" interspersing descriptors of each various kind of message according to the time it was sent, according to the recipient of the message, according to a description of the message (e.g., a subject line) or according to other similar mechanisms.

In a first general aspect, a computer-implemented method processing voicemail is described. The method includes receiving a voicemail message from a first telephone user for a second telephone user; providing, for display in a messaging inbox of the second telephone user, the voicemail message or information used to retrieve the voicemail message; and providing the voicemail message or information used to retrieve the voicemail message in a messaging outbox of the first telephone user, wherein the messaging outbox is formatted to display to the first telephone user a plurality of messages sent by the first telephone user.

In a second general aspect, a voice messaging system is described. The system includes a personal information manager configured to store e-mail and telephone number information for a plurality of contacts; a voicemail manager to receive and store voicemails for review of the voicemails, after they have been sent, by voicemail senders and voicemail recipients; and a messaging manager to receive display information about the voicemails and organize the display information so that a voicemail sender may see the display information about a plurality of sent message types, including information from the personal information manager, and may review and e-mail their sent voicemails.

In still another general aspect, a computer-implemented voice messaging system is described. The system includes a personal information manager configured to store e-mail and telephone number information for a plurality of contacts; a voicemail manager to receive and store voicemails for review of the voicemails, after they have been sent, by voicemail senders and voicemail recipients; and means for providing for the display of voicemail information to a user who sent a corresponding voicemail message, along with similar information about other types of messages sent by the user.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
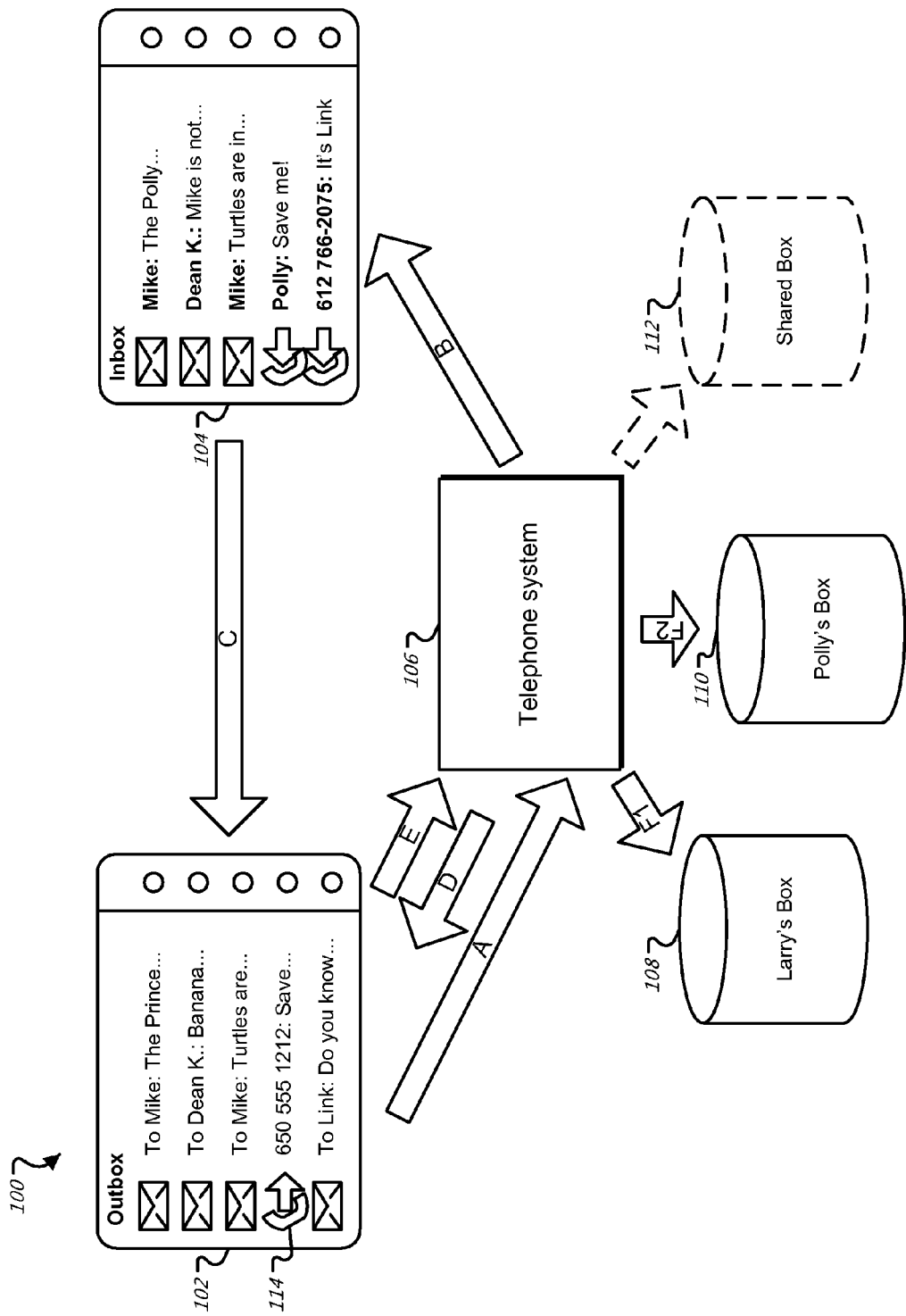
FIG. 1 is a conceptual diagram showing integrated management of messages, including outgoing voice mail messages.

In a given day, a busy individual can send and receive hundreds of e-mail messages, dozens of voicemail messages, and even more text messages. Other messaging modalities are also being developed, such as micro-blogging and other similar techniques. Some e-mail systems allow a user to view sent e-mail messages in the user's e-mail outbox. The same ability to recall what information has been transmitted can assist the user in a voicemail setting, including verification that a voicemail was sent. However, telephone functionality is often separated form e-mail functionality so that, although a user can easily access incoming voice mails that are typically stored on their own local system (so that a bridge can be made between an e-mail system and voice mail storage), the same is not generally true for voice mail systems where the voice mail message is stored on a system for the recipient. A system saving voicemails for both the recipient and the caller would allow each individual to track information and requests from both parties, reducing confusion and inefficiencies.

In general, a caller can leave a voicemail for a recipient in a telephone system. The telephone system can be a private branch exchange (PBX), the public switched telephone network (PSTN), or other telephone systems, and the message may be left with a service that is attendant to the system. The caller can try to reach a recipient via telephone and reach that person's voicemail inbox. After the caller leaves a voicemail in the recipient's voicemail inbox, the system can provide a copy of the voicemail message to the caller's outbox. Alternatively or in addition, the system can provide a pointer to the caller's voicemail message in the caller's voicemail outbox.

The caller may then be able to interact with the message in manners similar to their interaction with other types of messages, in a universal messaging application. For example, an indicator for the message may be displayed in a chronological list of other outgoing messages for the caller (e.g., e-mail, text, micro-blog, etc.). The caller may also forward the voice mail message (e.g., as an attachment to an e-mail or as a pointer in an e-mail) through the messaging application, or may otherwise send an e-mail that is based on the message. For example, a caller may access a voice mail message in his or her outbook, and may choose to forward the message, such as by forwarding it to the same person they previously called. Such a step may cause a copy of the message to be attached to an e-mail to be sent to the callee—where the e-mail address of the callee is automatically determined by cross-referencing it to a telephone number of the callee in a contacts database that I accessible to the caller. Such an action may occur where the caller wants to make sure the callee receives the message, by whatever means. Also, the e-mailed version of the message may include transcribed text of the message. This may allow the caller to better reference the message from his or her outbox (or wherever else the caller chooses to have such messages stored) or the callee to receive the message. For example, the callee may be in a meeting where he or she could read the message but would not be able to listen to the message. In effect, such a technique provides a much more convenient and more effective approach than the caller leaving a voice mail and then manually composing a separate e-mail that says: "I just left you a voice mail. Could you listen to it and get back to me?"

FIG. 1 is a conceptual diagram showing integrated management of messages, including outgoing voice mail messages. In general, a system 100 is shown that provides a voicemail message or pointer to the voicemail message in an outbox of the individual who left the voicemail. The message can contain an audio file of the voicemail, a transcription of the voicemail, or a combination of an audio file and transcription. The voicemail message can include data such as the caller's name, telephone number, and time called.

In the example shown in FIG. 1, the caller, Polly, can use a first communication device 102, such as a smart phone device or other form of computer-powered communication device, to call a second communication device 104 through a telephone system 106. The screens of devices 102 and 104 show the result of various messaging activities by various messaging modalities, with device 102 showing an outbox and device 104 showing an inbox. The messages are shown in a familiar manner sorted by reverse chronological order (i.e., newest messages at the top). The message type, message sender/recipient, and messages subject are shown for each message. As for message types, speaking bubbles are shown to indicate text messages, "pips" to indicate short-lived (and short) micro-blog messages, envelopes to indicate e-mails, and telephones to indicate voice mail messages (with associated arrows to indicate incoming or outgoing messages).

With respect to the voice mail message having "Save Me!" as a subject, Polly first sent a call (indicated by Arrow A) through the telephone system 106. The telephone system 106 connected the call (Arrow B) to the recipient's (Larry's) communication device 104. (If Larry had previously established a "do not disturb" status with the telephone system 106, then no message may have needed to be sent to Larry's device at this point.) In this instance, Larry did not answer the call on his communication device 104. Larry's recorded message was thus sent (Arrows C and D) to Polly's communication device 102. Polly transmitted a message (Arrow E) to the telephone system 106 in response. The telephone system 106 stored the message in Larry's box 108 (Arrow F1) and in Polly's box 110 (Arrow F2). Alternatively, the telephone system may only have one shared box 112 for voicemails, where each user may be served the message, and the message is saved until both users choose to delete it. The message can be displayed as an outgoing voicemail message 114 on Polly's communication device 102, and an incoming message on Larry's device 104.

A lower e-mail indicator on the devices 102, 104 shows the result of a follow-up communication by Polly. In particular, after leaving the voice mail message, Polly may be concerned that Larry does not listen to his voice mail often, and is more likely to see an e-mail immediately, such as if he is in a meeting. Her actions in doing so may have started with her selecting the indicator for the outgoing voice mail in her outbox, which may have caused a window showing information about the voice mail to be instantiated. The window may be much like an e-mail message, and may contain a textual transcript of the message and a link to the voice mail message or an audio file of the message. Selectable controls may be shown in the window that are similar to the "reply," "reply to all," and "forward" controls typically provided with an e-mail message. In this example, Polly may have selected a "forward" control or a "follow-up" control that then causes the message to be sent to Larry as an e-mail message.

A link between the follow-up message and the original voice mail message may also be created so as to permit improved control of further action concerning the messages. For example, if the system determines that Larry has listened to the message via the e-mailed follow-up messaged or read the text of the message, the system may show the voice mail message as having been reviewed (e.g., by de-emphasizing the message). In a similar manner, the system may delete the message from both messaging modalities (the e-mail or the voice mail) if the user deletes it in one.

The telephone system 106 can provide access to the caller's voicemail outbox 110 in various implementations. For example, the voicemail message 114 can be stored in a central location as a single file with a pointer to the file in the caller's voicemail outbox 110. The pointer may be a hyperlink to the voicemail message. Likewise, a pointer, or a hyperlink, can be in the caller's voicemail outbox 110, but the voicemail message 114 can be stored in various separate files, with a metafile to link to an audio file, a text transcription of the audio file, caller identification data, and other associated data.

In some implementations, the voicemail message 114 can be stored in multiple locations. For example, the voicemail message can be stored in a central server and on the caller's communication device 102. In some implementations, the voicemail message 114 can be stored in the recipient's communication device 104 and the caller's communication device 102. In other implementations, the voicemail message 114 can be directed to more than one recipient. For example, if Polly wanted to blind carbon copy the voicemail message 114 she sent to Larry, the voicemail message 114 could be stored in three separate communication devices. Alternatively, the voicemail message could be stored in multiple separate user boxes.

In some implementations, the recipient may not be within the same voicemail system as the caller. For example, if the recipient does not have a box for messages, the voicemail message 114 can be stored for the caller without any file stored for the recipient. In some implementations, the recipient can receive an invitation to join the caller's voicemail system. In some implementations, a separate message can be sent to the caller that the recipient is not part of the system. In some implementations, the caller can be notified within the voicemail message 114 that the recipient is not within the same voicemail system. In some implementations, the system 100 can send voicemail data to callers and recipients if they are in the same voicemail system or in separate voicemail systems.

The process can include voice mail boxes for individuals who share the same communication device. For example, when coworkers share the same telephone, during different times, the coworkers can each have their own box. If a caller calls a recipient who uses the same communication device as the caller, the caller can leave a voicemail message 114 in the recipient's box and receive the voicemail message 114 in her own box. Such use of separate boxes by users of different devices may be implemented, for example, by playing messages from a central server and tying boxes to log in identifiers rather than to particular devices, or by separating storage on a single device and blocking one user from accessing another user's data.

In some implementations, the communication device can allow Polly to search her outgoing voicemail messages using search terms. For example, Polly may wish to find all messages regarding a particular topic. If she enters the term "Bowser", her communication device 102 can search both voice mail and e-mail messages for such a term. In some implementations, Polly can select whether she wants to search in both e-mail and voicemail messages, or only one group of messages at a time. In some embodiments, Polly can select whether she wants to search in both outgoing and incoming messages, or only one group of messages at a time.

Polly may obtain a new telephone number in certain circumstances. For example, Polly may move to a new state and change her cell phone number to fit a local area code. In such an instance, the voicemail messages can be redirected to a new box 112. Alternatively, pointers to the voicemail messages can be accessed by her new cell phone number. Also, messages may be routed in other ways, such as if Polly has a single device that delivers calls to her even if users dialed different numbers, or where she can have calls routed to different devices, such as using a service like GRAND CENTRAL.

Figure 2A:
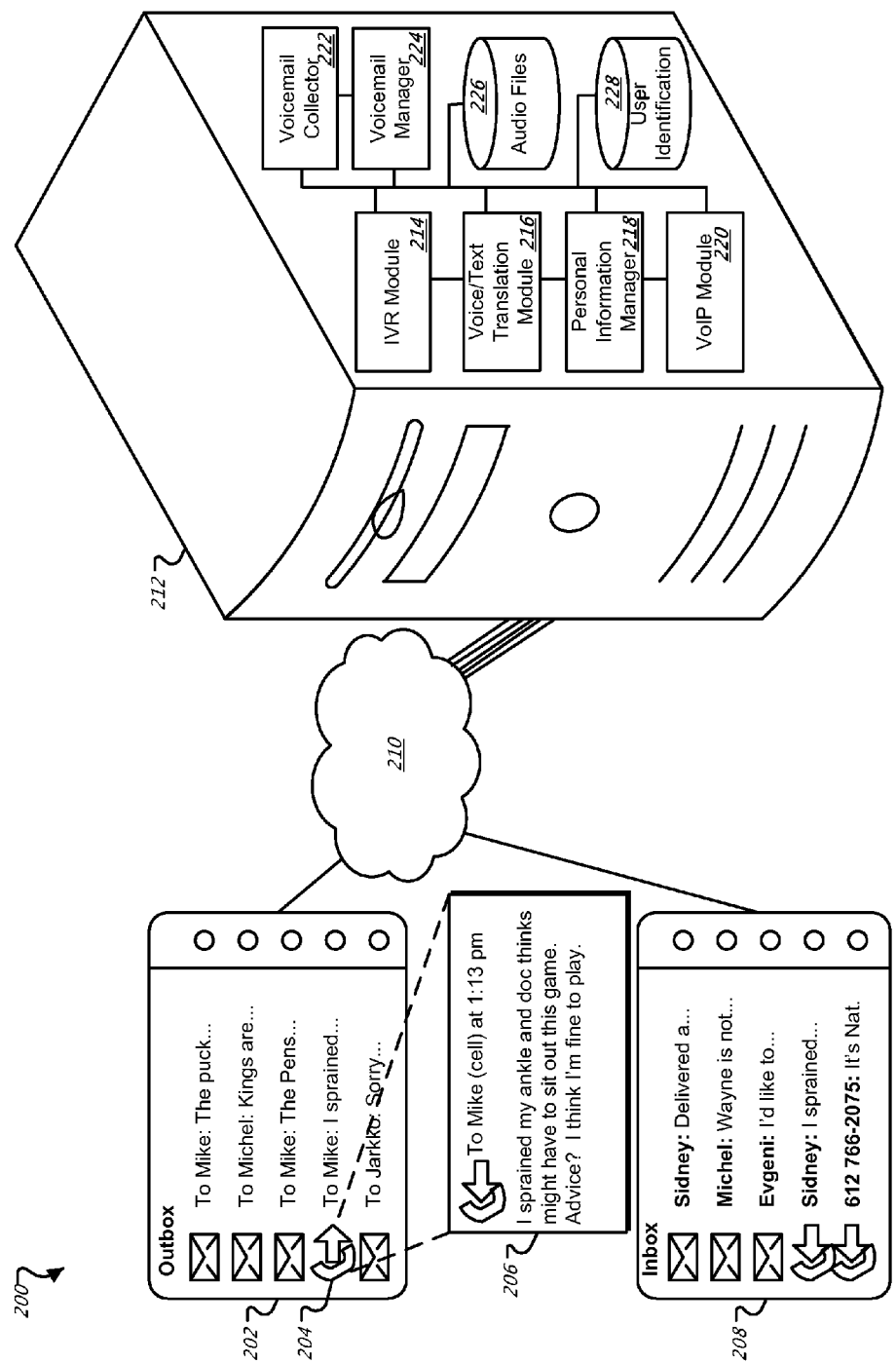
FIG. 2A is a schematic diagram of a system for providing voicemail messages in a caller's outbox.

FIG. 2A is a schematic diagram of a system for providing voicemail messages in a caller's outbox. The system 200 includes a first communication device 202, a second communication device 208, and a voicemail message server 212. Though shown as a single server for clarity of description, the server 212 may be many different servers that share components and operations like those described here, and may be supplemented by servers that perform other related operations. For example, other servers may provide a user with maps associated with a message that contains an address, an ad server may server ads relevant to a message, a search server may allow a user to search various corpuses of information such as the internet, images, or other information.

In this example, messaging occurs between two users—Sidney and Mike Limeaux. Here, Sidney can use his communication device 202 to call Mike's communication device 208 through a network 210. Mike's device 208 does not receive the call and Sidney can thus leave an audio voicemail message. The voicemail message server 212 can data with the audio message and send the data to the outbox of Sidney's communication device 202. Sidney's communication device 202 can display a voicemail message header 204 from the transmission of the voicemail message server 212. As shown in more detail, a voicemail message 206 can also be displayed (e.g., if Sidney selects the displayed header). The voicemail message 206 can be transmitted to Sidney's communication device 202 from the voicemail message server 212. For example, if Sidney wants to check to see when he asked Mike for advice on his possible sprain, he can look at his outbox for outgoing voicemail messages. The actual audio file of the message may itself can be kept on the device 202 or sent from he server 212 to the device 202, or may be stored on the server and played as audio transmitted over a telephone communication to the device 102, like a hosted voice mail system.

The voicemail message server 212 has several components that can be used to parse and provide data relating to a voicemail. The voicemail message server 212 can have an interactive voice response (IVR) module 214, a voice/text translation module 216 a personal information manager 218, a voice over internet protocol (VoIP) module 220, a voicemail collector 222, and a voicemail manager 224, as well as an audio files database 226 and a user identification database 228.

The IVR module 214 can receive voicemail data in both voice and touch tones to translate Sidney's input as data that is associated to the audio message. For example, if Sidney presses a certain numeric code while listening to Mike's automated greeting, he can ensure that the number from which he is calling is transmitted in the voicemail message 206. With audio input, the voice/text translation module 216 can also provide further associated data to Sidney's audio message. For example, the voice/text translation module 216 can provide a transcription of Sidney's audio message.

The personal information manager 218 can provide details of a particular caller, such as matching Sidney's name from the phone number he may use to leave the message. For example, the user identification database 228 can be used to provide data associated with a particular phone number.

As described further below, the personal information manager 218 can determine other details, such as user preferences. In some implementations, the user identification database 228 can store user preferences. For example, if Sidney Crosby prefers to be identified in voicemail message headers as "Sid the Kid" instead of "Sidney Crosby," this preference can be stored in the user identification database 228. The personal information manager 218 can be used to provide the preference in the voicemail message header 204.

If Sidney uses a VoIP connection to call, the VoIP module 220 can ensure that the audio message is properly sequenced. For example, the VoIP module 220 can provide a jitter buffer to order data packets. The voicemail collector 222 can piece together the data for the voicemail message 206 with associated data. The associated data can include such information as a timestamp, a name of the caller, a number of the caller, an audio file of the audio message, and a transcription of the audio message.

The voicemail message 206 can be transmitted using the voicemail manager 224. Once the voicemail message 206 has been compiled from the audio message and associated data, the contact information of the caller can be accessed from the user identification database 228. In some implementations, the voicemail manager 224 can use the caller's caller identification to retrieve the contact information for the caller. The voicemail message 206 can then be transmitted with the information provided by the voicemail manager 224.

In some implementations, the voicemail manager 224 can determine which communication devices should receive the voicemail message 206. For example, the voicemail manager may determine that Mike's communication device 208 is outside the system 200 and provide data to the user identification database 228 that Mike cannot receive voicemail messages. In some implementations, the voicemail manager can determine that Sidney's outbox can receive the voicemail message 206, but that the voicemail message 206 is unable to be received by Mike's communication device 208.

Data sources in the voicemail message server 212 can provide the data for the voicemail message 206. The audio files database 226 can provide the audio file in the voicemail message. For example, the audio file may be associated with a URL and the display of the voicemail message may show a tag for the URL that a user can select. The audio file may also be attached to the voicemail message, as a file is attached to an e-mail message. The file may likewise be address via a variety of other appropriate mechanisms. In some implementations, the audio files database 226 can also provide the audio files for automated messaging, such as Mike's recorded greeting. Like an address book, the user identification database 228 can provide information to assist the voicemail message server 212 in providing information in the voicemail message 206. If Sidney calls from a landline phone unconnected to the system 200, the phone number having been stored under his name, the system 200 can transmit the voicemail message 206 to Sidney's communication device 202.

As discussed previously, the personal information manager 218 can assist in determining appropriate data for the voicemail message 206. In some implementations, the caller can pre-select settings for his voicemail outbox, such as number of words within a header, flagging messages for specific contacts, and organizing the outbox by date or alphabetical order of the callee. For example, Sidney can preset the first five words of the transcribed message as the header to the voicemail message 206. In some implementations, the callee can pre-select settings for voicemails being transmitted to his inbox, and those settings can be transmitted to the caller's outbox. For example, in the "To" field of the voicemail message 206, the callee's name can be displayed as the callee displays it for his e-mail messages.

In other implementations, an administrator of the system 200 can provide predetermined settings for the system 200. For example, if the system 200 is tied directly to a PBX for a company, company voicemail messages can require specific data to be included in all outgoing voicemail messages as they are recorded.

As described previously above, the voicemail manager 224 can determine which devices and clients should receive the voicemail message 206. In some implementations, the voicemail message 206 can be sent to Sidney's e-mail client. For example, as shown in FIG. 2A, if Sidney is using a multimedia communication device that has both e-mail and voicemail capabilities, the voicemail message 206 can be included in Sidney's outbox with outgoing e-mail messages. In some implementations, the voicemail message 206 can be sent to Sidney's e-mail outbox, which may be accessed through a computer. For example, Sidney may want to provide a list of communications with a particular individual as team captain of the Pittsburgh Penguins. In an e-mail client, Sidney can attach various e-mail and voicemail messages to provide a history to a recipient. In some implementations, Sidney can access the voicemail message 206 through a telephone and forward the audio message to recipient. Likewise, Sidney can forward the entire voicemail message 206 to a recipient, including the text-based associated information without having to access such information.

Figure 2B:
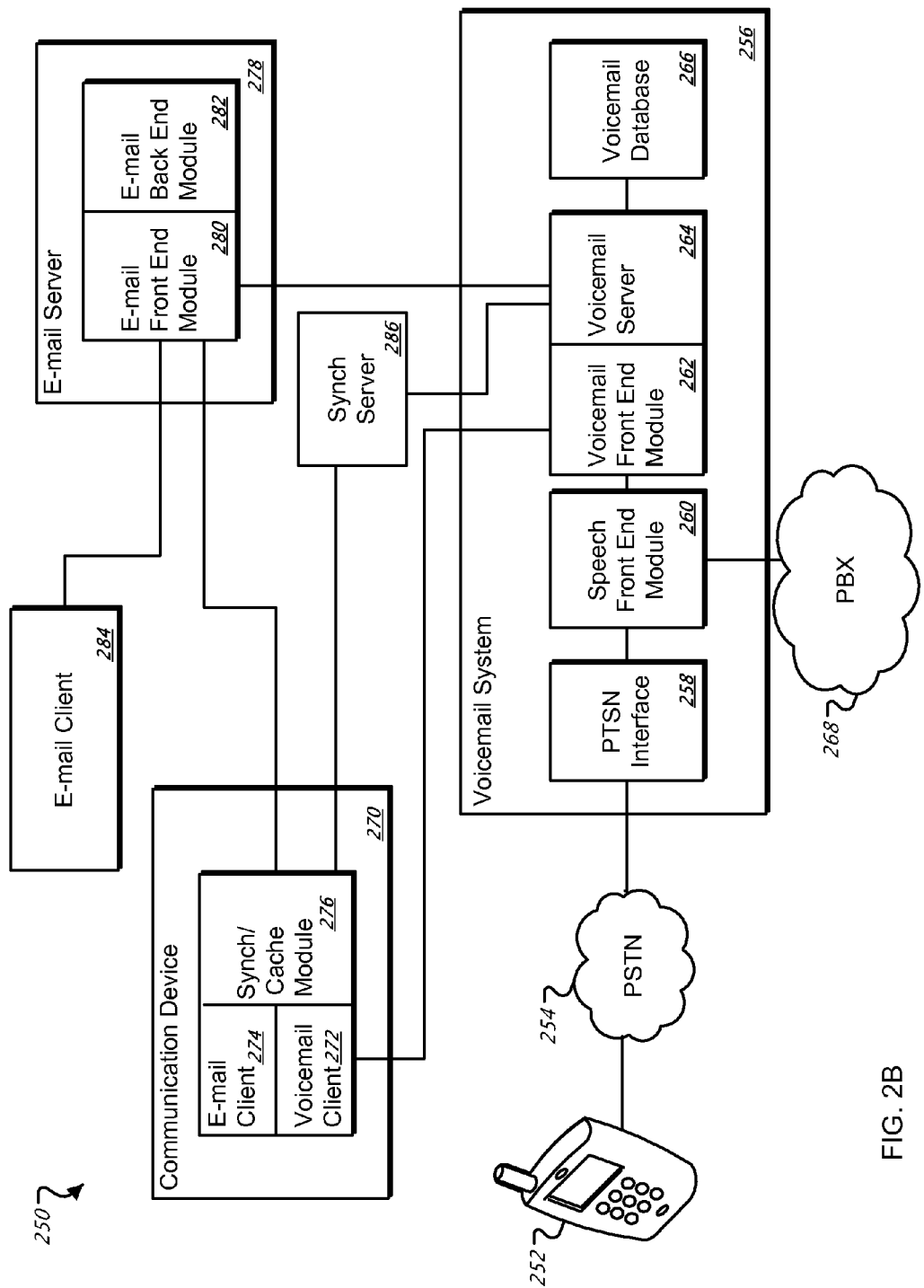
FIG. 2B is a schematic diagram of another system to provide voicemail messages to a user outbox.

FIG. 2B is a schematic diagram of a system 250 to provide voicemail messages to a user outbox. In general, the system shows components in a mobile communication device 270, an e-mail server 278, and a voicemail system 256 that cooperate to provide a user of a system with information about a variety of forms of messaging, including e-mails and voicemails. In this example, the voicemail system 256 serves a business or office within a business, but could also be an exterprise service offered by a company such as GOOGLE to its registered users.

Here, a communication device 270 can call a mobile device 252 through a PSTN 254, leave an audio message, and receive a voicemail message with the audio message incorporated in the caller's outbox. The voicemail system 256 can extrapolate data from the audio message and from other sources, such as a voicemail database 266, to provide associated data with the audio message. For example, if the telephone number is stored within the voicemail database 266, an associated recipient's name can be included in the voicemail message as associated data with the audio message. As discussed further below, if the caller does not have an account within the system 250, for example if the caller does not work for the company that operates the voicemail system 256, various methods can be used to provide the voicemail message to the caller. In some implementations, the voicemail database 266 can associate the caller's number with an e-mail address. The voicemail system 256 can transmit the voicemail message to the system's 250 e-mail client 284. The e-mail client 284 can send the voicemail message to the caller's e-mail address through the Internet. In some implementations, the system 250 can call the caller's number back and send an automated message inviting the caller to get a system account. Likewise, the system 250 can attach the audio message the caller left with the invitation.

The voicemail system 256 can receive an audio message and determine specific associated data, such as a transcription of the audio message and time stamp information, to include with the audio message. The voicemail system 256 can also store voicemail messages for one or more account holders. For example, if the voicemail system 256 is provided for a company, the voicemail system 256 can have an account for each employee. The voicemail system 256 includes a Public Telephone Switched Network (PTSN) interface 258, a speech front end module 260, a voicemail front end module 262, a voicemail server 264, and a voicemail database 266.

The PTSN interface 258 can receive telephone calls and transmit them to the speech front end module 260. For example, if a callee does not pick up the phone after a certain number of rings to his communication device, the PTSN interface 258 can transmit the telephone call to the speech front end module 260. In some implementations, the callee can set his device such that the PTSN interface 258 automatically routes calls from particular callers to the speech front end module 260.

The speech front end module 260 can record an audio message. For example, after a greeting message has been played for the caller, the caller can leave a message to be recorded by the speech front end module 260 that can be stored in the voicemail database 266. As discussed further below, the speech front end module 260 can have various other roles. The speech front end module 260 can transmit information to the voicemail front end module 262. The voicemail server 264 can receive data from the voicemail front end module 262. In some implementations, the voicemail front end module can communicate with devices outside the voicemail system 256. For example, the voicemail front end module 262 can transmit voicemail messages to the caller's communication device 270. The voicemail server 264 can retrieve information from the voicemail database 266. For example, the voicemail database 266 can store an address book providing name, title, and other contact information for a particular phone number. Likewise, the voicemail database 266 can store previous voicemail messages. As described further below, voicemail messages can be stored in various configurations. The voicemail database 264 can also receive information from the voicemail server 264, such as new voicemail messages. The voicemail server 264 also can transmit information to the e-mail server 278.

E-mail messages can be stored in and managed by the e-mail server 278. For example, e-mail messages may be receive from an e-mail client 284 of a user associated with the system (e.g., for outgoing e-mails) or with other users, where the e-mail messages may be received over an network such as the Internet (e.g., for incoming messages). E-mail messages may also be generated automatically by various components in the system 250, such as voicemail system 256.

The e-mail server 278 includes an e-mail front end module 280 and an e-mail back end module 282. The e-mail front end module 280 can transmit and receive information from various sources, such as the e-mail client 284 and the communication device 270. In some implementations, e-mail message information can be transmitted between an e-mail back end module 282 and an e-mail client 284 through the e-mail front end module 280. In some implementations, messages can be transmitted to the synch/cache module 276. For example, the synch/cache module 276 can communicate with other devices to update voicemail and e-mail messages. Likewise, the synch/chance module 276 can store data relating to voicemail and e-mail messages for the communication device 270. For example, the synch/cache module 276 can store headers in the communication device 270 for voicemail messages with pointers to the voicemail message stored in another location. Alternatively, the synch/cache module 276 can store entire messages in the communication device 270 for a predetermined period of time, such as five days. In some implementations, the e-mail server 278 can also store voicemail messages. In some implementations, the e-mail server 278 can include a common data store for all users. In some implementations, the e-mail server 278 can include a data store for each user for both e-mail and voicemail messages. In some implementations, the e-mail server 278 can have separate voicemail and e-mail data stores. Likewise, voicemail message pointers to voicemail messages stored in the voicemail database 266 can be stored in the e-mail server 280.

The communication device 270 can provide an interface to the caller to the e-mail server 278 and the voicemail system 256 to communicate with users within the system 250 or users outside the system. The communication device 270 has a voicemail client 272, an e-mail client 274, and a synch/cache module 276. The synch/cache module 280 can communicate with the e-mail front end module 280. For example, if the caller sends an e-mail, the synch/cache module can transmit the information to the e-mail server. Likewise, if the caller receives an e-mail message, it can be transmitted to the synch/cache module. The synch/cache module 276 can also automatically update the communication device 270 on a predetermined basis, such as every five minutes or every time the device is activated. The e-mail client 274 can perform similar functions to the e-mail client 284 outside of the communication device 270. For example, the caller can use the communication device to send and receive e-mail messages. The voicemail client 272 can communicate with the voicemail front end module 262 to receive voicemail messages. Alternatively, the voicemail client 272 can receive voicemail messages from the synch/cache module through the e-mail server or the synch server 286.

The synch server 286 can be used to synchronize the communication device 270 and the voicemail system 256. For example, the synchronizing server 286 can determine that the voicemail server 264 contains a message that the communication device 270 has not yet received.

As discussed previously, various methods can be used to provide the voicemail message to the caller if the caller does not have a voicemail account with system 250. For example, if the caller is an employee of a corporation calling a vendor, the vendor may not be within the same voicemail system as is the caller. The voicemail server may have caller identification to identify the caller. In some implementations, the caller can receive an automated message to join the system 250, while the outgoing messages of the caller can be saved for a predetermined period of time within the system 250. In some implementations, the system 250 can transmit an invitation to the caller's e-mail address to join the system 250. In some implementations, an e-mail message can be sent to the recipient to remind them to invite the caller to the system 250.

As described above, voicemail messages can be stored in various configurations. In some implementations, a voicemail message can be stored in one file. In some implementations, the voicemail message can be stored in separate groups, such as an audio message file, an transcription text file, and an associated metadata file. The audio messages can be stored as single audio files in a single location for each voicemail message even if multiple users can access the files, with pointers to the audio messages stored in locations such as the communication device 270 and the e-mail server 278. In some implementations, each voicemail message can be stored in multiple locations. For example, the communication device can store a voicemail message while the mobile device 252 can store a duplicate of the voicemail message.

Other audio files, such as audio greetings to a caller who has reached a callee's voicemail, can be stored and played by various devices. As discussed previously, the speech front end module 260 can have various functions within the system 250. In some implementations, the speech front end module 260 can play an audio greeting. In some implementations, the speech front end module 260 can receive calls directly from a PBX 268. In some implementations, a call can be authenticated in the speech front end module 260 with a caller-id and a personal identification number (PIN) combination.

Figure 3:
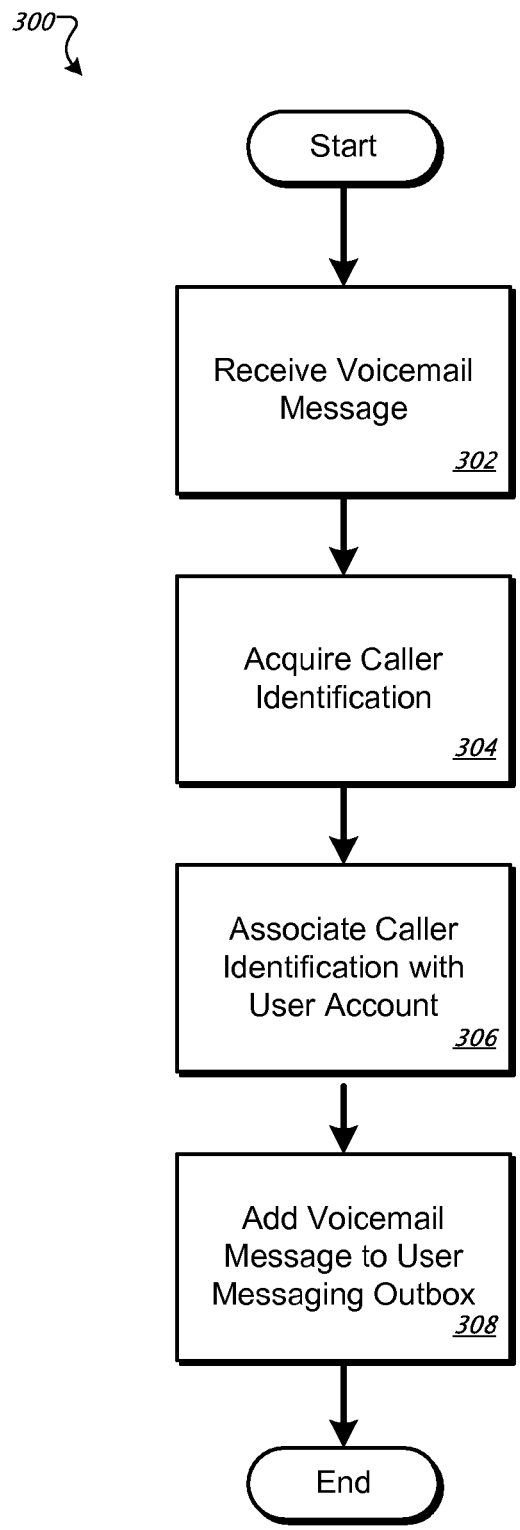
FIG. 3 is a flowchart of an exemplary method for storing a voicemail message in a caller's messaging outbox.

FIG. 3 is a flowchart of an exemplary method 300 for storing a voicemail message in a caller's messaging outbox. The systems 200 and 250 are used in an example implementation of method 300. However, other systems, including the system 100, can implement the method 300.

In box 302, a voicemail message is received. For example, the voicemail message server 212 can receive a voicemail message. In some implementations, the voicemail message can include an audio message and caller identification. Alternatively, the caller identification can be stored in a separate file. In some implementations, the voicemail message can include metadata regarding the recipient and a timestamp.

At box 304, caller identification is acquired. For example, the user identification database 228 can store caller identification information from a request. In some implementations, the personal information manager 216 can provide information to the voicemail manager 224. In some implementations, the voicemail database 266 can provide data to the voicemail server to determine caller identification. In some implementations, the caller identification can be acquired using a PIN for an account. For example, if Sidney Crosby calls from Wayne Gretsky's phone, but wants to receive the outgoing voice message in his mailbox, Sidney can call a central number and enter his account number and PIN to self-identify. As described further below, acquiring caller identification can also associate the caller identification with a user account.

In some implementations, the caller identification can be stored in the communication device 270. For example, if the user has a contacts database in their communication device 270, the caller identification can be stored in the device. Likewise, the e-mail server 278 can store the caller identification. In some implementations, caller identification can be stored in two separate devices. For example, if the caller's telephone number and name are stored on the communication device 270 and the user's name and e-mail address are stored on the e-mail server 278, the method 300 can acquire caller identification from these two sources.

In box 306, caller identification is associated with a user account. For example, the user account database 228 can identify Sidney Crosby's call with his account. In some implementations, the association can be determined using the number the caller has dialed. As described above, the association can be determined using acquiring caller identification to associate the caller identification with a user account.

In box 308, a voicemail message is added to a user messaging outbox. For example, the voicemail manager 224 can transmit the voicemail message to the In some implementations, the voicemail message can be added to a user messaging outbox using a pointer. For example, the voicemail message can be stored in the voicemail database 266 while the communication device 270 can store the user messaging outbox with a pointer to the voicemail message. Alternatively, the voicemail message can be stored in the e-mail server 278, which can also store the user messaging outbox. In other implementations, the voicemail message can be stored in multiple locations, including the user messaging outbox.

The method 300 described herein may be performed in various implementations, including implementations in which different boxes are performed in different orders. In some implementations, boxes can be performed simultaneously.

Figure 4:
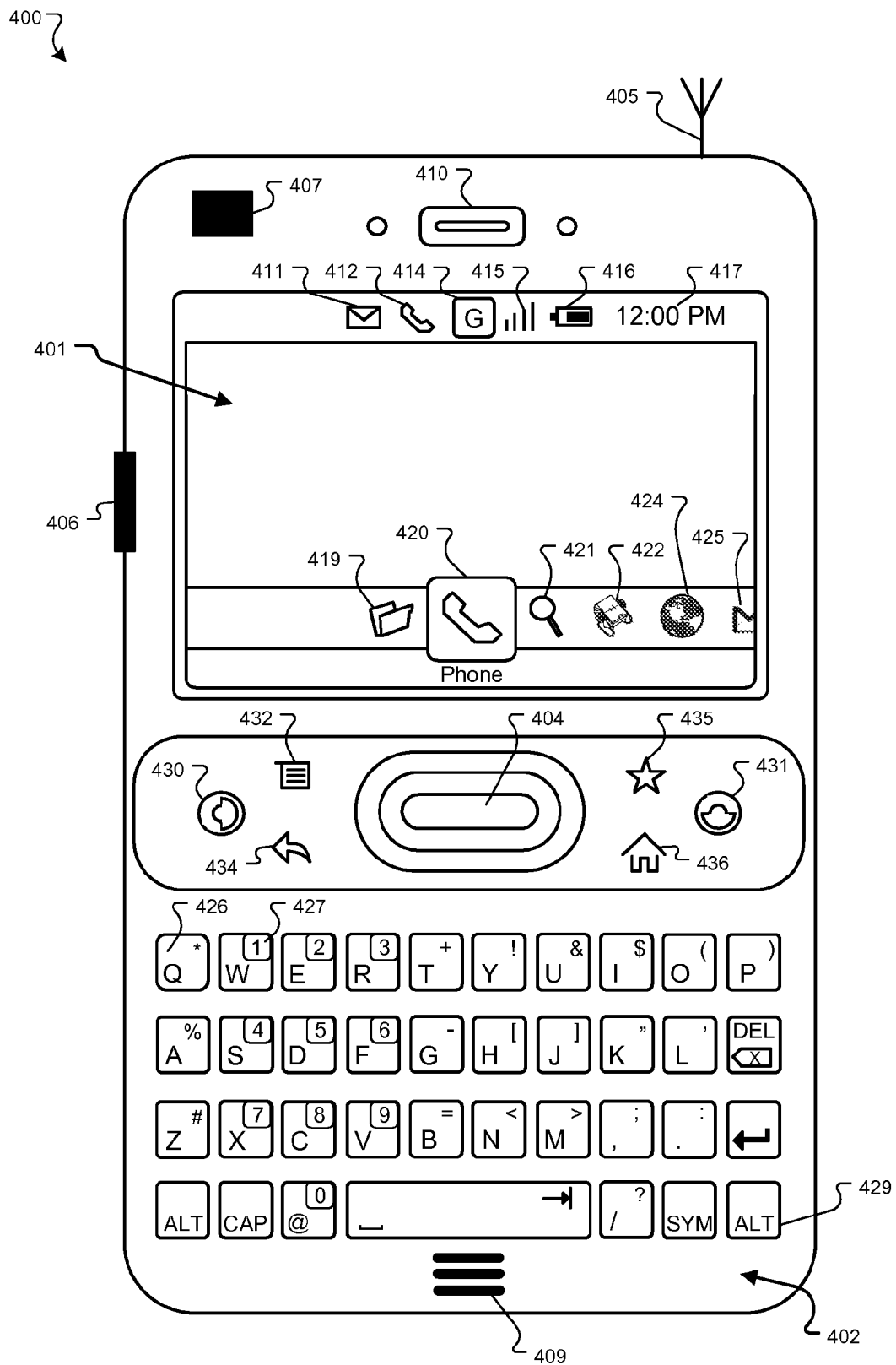
FIG. 4 is a schematic representation of an exemplary mobile device that implements embodiments of the automated call director described herein.

Referring now to FIG. 4, the exterior appearance of an exemplary device 400 that stores voicemail messages in a user account's outbox is illustrated. Briefly, and among other things, the device 400 includes a processor configured to store a voicemail message in a caller's messaging outbox of a user of the mobile device.

In more detail, the hardware environment of the device 400 includes a display 401 for displaying text, images, and video to a user; a keyboard 402 for entering text data and user commands into the device 400; a pointing device 404 for pointing, selecting, and adjusting objects displayed on the display 401; an antenna 405; a network connection 406; a camera 407; a microphone 409; and a speaker 410. Although the device 400 shows an external antenna 405, the device 400 can include an internal antenna, which is not visible to the user.

The display 401 can display video, graphics, images, and text that make up the user interface for the software applications used by the device 400, and the operating system programs used to operate the device 400. Among the possible elements that may be displayed on the display 401 are a new mail indicator 411 that alerts a user to the presence of a new message; an active call indicator 412 that indicates that a telephone call is being received, placed, or is occurring; a data standard indicator 414 that indicates the data standard currently being used by the device 400 to transmit and receive data; a signal strength indicator 415 that indicates a measurement of the strength of a signal received by via the antenna 405, such as by using signal strength bars; a battery life indicator 416 that indicates a measurement of the remaining battery life; or a clock 417 that outputs the current time.

The display 401 may also show application icons representing various applications available to the user, such as a web browser application icon 419, a phone application icon 420, a search application icon 421, a contacts application icon 422, a mapping application icon 424, an email application icon 425, or other application icons. In one example implementation, the display 401 is a quarter video graphics array (QVGA) thin film transistor (TFT) liquid crystal display (LCD), capable of 16-bit or better color.

A user uses the keyboard (or "keypad") 402 to enter commands and data to operate and control the operating system and applications that provide for storing a voicemail message in a caller's messaging outbox. The keyboard 402 includes standard keyboard buttons or keys associated with alphanumeric characters, such as keys 426 and 427 that are associated with the alphanumeric characters "Q" and "W" when selected alone, or are associated with the characters "*" and "1" when pressed in combination with key 429. A single key may also be associated with special characters or functions, including unlabeled functions, based upon the state of the operating system or applications invoked by the operating system. For example, when an application calls for the input of a numeric character, a selection of the key 427 alone may cause a "1" to be input.

In addition to keys traditionally associated with an alphanumeric keypad, the keyboard 402 also includes other special function keys, such as an establish call key 430 that causes a received call to be answered or a new call to be originated; a terminate call key 431 that causes the termination of an active call; a drop down menu key 432 that causes a menu to appear within the display 401; a backward navigation key 434 that causes a previously accessed network address to be accessed again; a favorites key 435 that causes an active web page to be placed in a bookmarks folder of favorite sites, or causes a bookmarks folder to appear; a home page key 436 that causes an application invoked on the device 400 to navigate to a predetermined network address; or other keys that provide for multiple-way navigation, application selection, and power and volume control.

The user uses the pointing device 404 to select and adjust graphics and text objects displayed on the display 401 as part of the interaction with and control of the device 400 and the applications invoked on the device 400. The pointing device 404 is any appropriate type of pointing device, and may be a joystick, a trackball, a touch-pad, a camera, a voice input device, a touch screen device implemented in combination with the display 401, or any other input device.

The antenna 405, which can be an external antenna or an internal antenna, is a directional or omni-directional antenna used for the transmission and reception of radiofrequency (RF) signals that implement point-to-point radio communication, wireless local area network (LAN) communication, or location determination. The antenna 405 may facilitate point-to-point radio communication using the Specialized Mobile Radio (SMR), cellular, or Personal Communication Service (PCS) frequency bands, and may implement the transmission of data using any number or data standards. For example, the antenna 405 may allow data to be transmitted between the device 400 and a base station using technologies such as Wireless Broadband (WiBro), Worldwide Interoperability for Microwave ACCess (WiMAX), 3GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Down-link Packet Access (HSDPA), Generic Access Network (GAN), Time Division-Synchronous Code Division Multiple Access (TD-SCDMA), Evolution-Data Optimized (or Evolution-Data Only) (EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CPDP), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285™ transceiver and PM7540™ power management circuit.

The wireless or wired computer network connection 406 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 406 may connect to a LAN network, a corporate or government WAN network, the Internet, a telephone network, or other network. The network connection 406 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 406 and the antenna 405 are integrated into a single component.

The camera 407 allows the device 400 to capture digital images, and may be a scanner, a digital still camera, a digital video camera, other digital input device. In one example implementation, the camera 407 is a 3 mega-pixel (MP) camera that utilizes a complementary metal-oxide semiconductor (CMOS).

The microphone 409 allows the device 400 to capture sound, and may be an omni-directional microphone, a unidirectional microphone, a bi-directional microphone, a shotgun microphone, or other type of apparatus that converts sound to an electrical signal. The microphone 409 may be used to capture sound generated by a user, for example when the user is speaking to another user during a telephone call via the device 400. Conversely, the speaker 410 allows the device to convert an electrical signal into sound, such as a voice from another user generated by a telephone application program, or a ring tone generated from a ring tone application program. Furthermore, although the device 400 is illustrated in FIG. 4 as a handheld device, in further implementations the device 400 may be a laptop, a workstation, a midrange computer, a mainframe, an embedded system, telephone, desktop PC, a tablet computer, a PDA, or other type of computing device.

Figure 5:
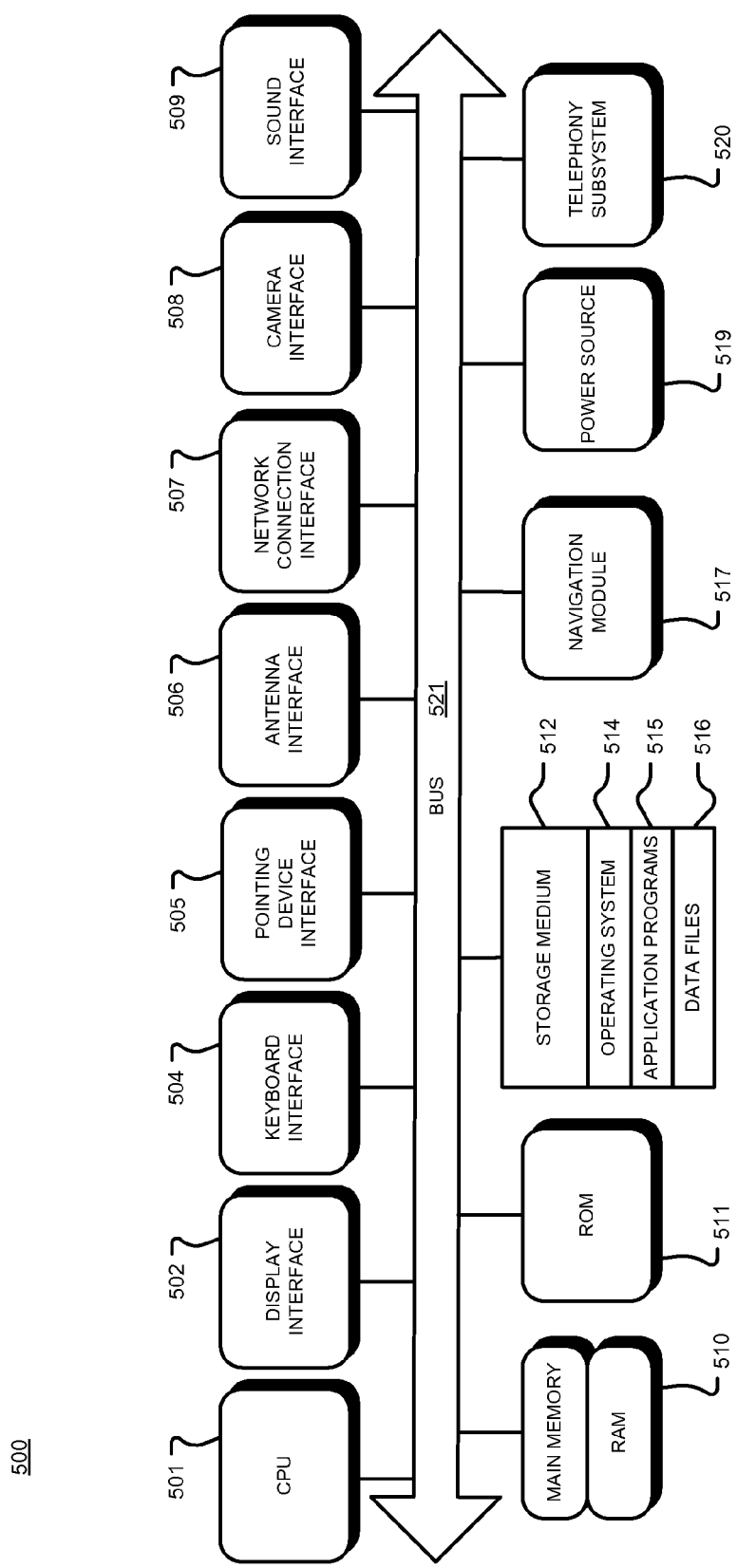
FIG. 5 is a block diagram illustrating the internal architecture of the device of FIG. 4.

FIG. 5 is a block diagram illustrating an internal architecture 500 of the device 400. The architecture includes a central processing unit (CPU) 501 where the computer instructions that comprise an operating system or an application are processed; a display interface 502 that provides a communication interface and processing functions for rendering video, graphics, images, and texts on the display 401, provides a set of built-in controls (such as buttons, text and lists), and supports diverse screen sizes; a keyboard interface 504 that provides a communication interface to the keyboard 402; a pointing device interface 505 that provides a communication interface to the pointing device 404; an antenna interface 506 that provides a communication interface to the antenna 405; a network connection interface 507 that provides a communication interface to a network over the computer network connection 406; a camera interface 508 that provides a communication interface and processing functions for capturing digital images from the camera 407; a sound interface 509 that provides a communication interface for converting sound into electrical signals using the microphone 409 and for converting electrical signals into sound using the speaker 410; a random access memory (RAM) 510 where computer instructions and data are stored in a volatile memory device for processing by the CPU 501; a read-only memory (ROM) 511 where invariant low-level systems code or data for basic system functions such as basic input and output (I/O), startup, or reception of keystrokes from the keyboard 402 are stored in a non-volatile memory device; a storage medium 512 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 514, application programs 515 (including, for example, a web browser application, a widget or gadget engine, and or other applications, as necessary) and data files 516 are stored; a navigation module 517 that provides a real-world or relative position or geographic location of the device 400; a power source 519 that provides an appropriate alternating current (AC) or direct current (DC) to power components; and a telephony subsystem 520 that allows the device 400 to transmit and receive sound over a telephone network. The constituent devices and the CPU 401 communicate with each other over a bus 521.

The CPU 501 can be one of a number of computer processors. In one arrangement, the computer CPU 501 is more than one processing unit. The RAM 510 interfaces with the computer bus 521 so as to provide quick RAM storage to the CPU 501 during the execution of software programs such as the operating system application programs, and device drivers. More specifically, the CPU 501 loads computer-executable process steps from the storage medium 512 or other media into a field of the RAM 510 in order to execute software programs. Data is stored in the RAM 510, where the data is accessed by the computer CPU 501 during execution. In one example configuration, the device 300 includes at least 128 MB of RAM, and 256 MB of flash memory.

The storage medium 512 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 400 to access computer-executable process steps, application programs and the like, stored on removable and non-removable memory media, to off-load data from the device 400, or to upload data onto the device 400.

A computer program product is tangibly embodied in storage medium 512, a machine-readable storage medium. The computer program product includes instructions that, when read by a machine, operate to cause a data processing apparatus to store image data in the mobile device. In some embodiments, the computer program product includes instructions to store a voicemail message in a caller's messaging outbox.

The operating system 514 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 514 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT .NET Compact, or another appropriate environment.

The device stores computer-executable code for the operating system 514, and the application programs 515 such as an email, instant messaging, a video service application, a mapping application word processing, spreadsheet, presentation, gaming, mapping, web browsing, JAVASCRIPT engine, or other applications. For example, one implementation may allow a user to access an email application, an instant messaging application, a video service application, a mapping application, or an imaging editing and presentation application. The application programs 515 may also include a widget or gadget engine, such as a TAFRI™ widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, a gadget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

Although it is possible to provide for storing a voicemail message in a caller's messaging outbox using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 517 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 517 may also be used to measure angular displacement, orientation, or velocity of the device 400, such as by using one or more accelerometers.

Figure 6:
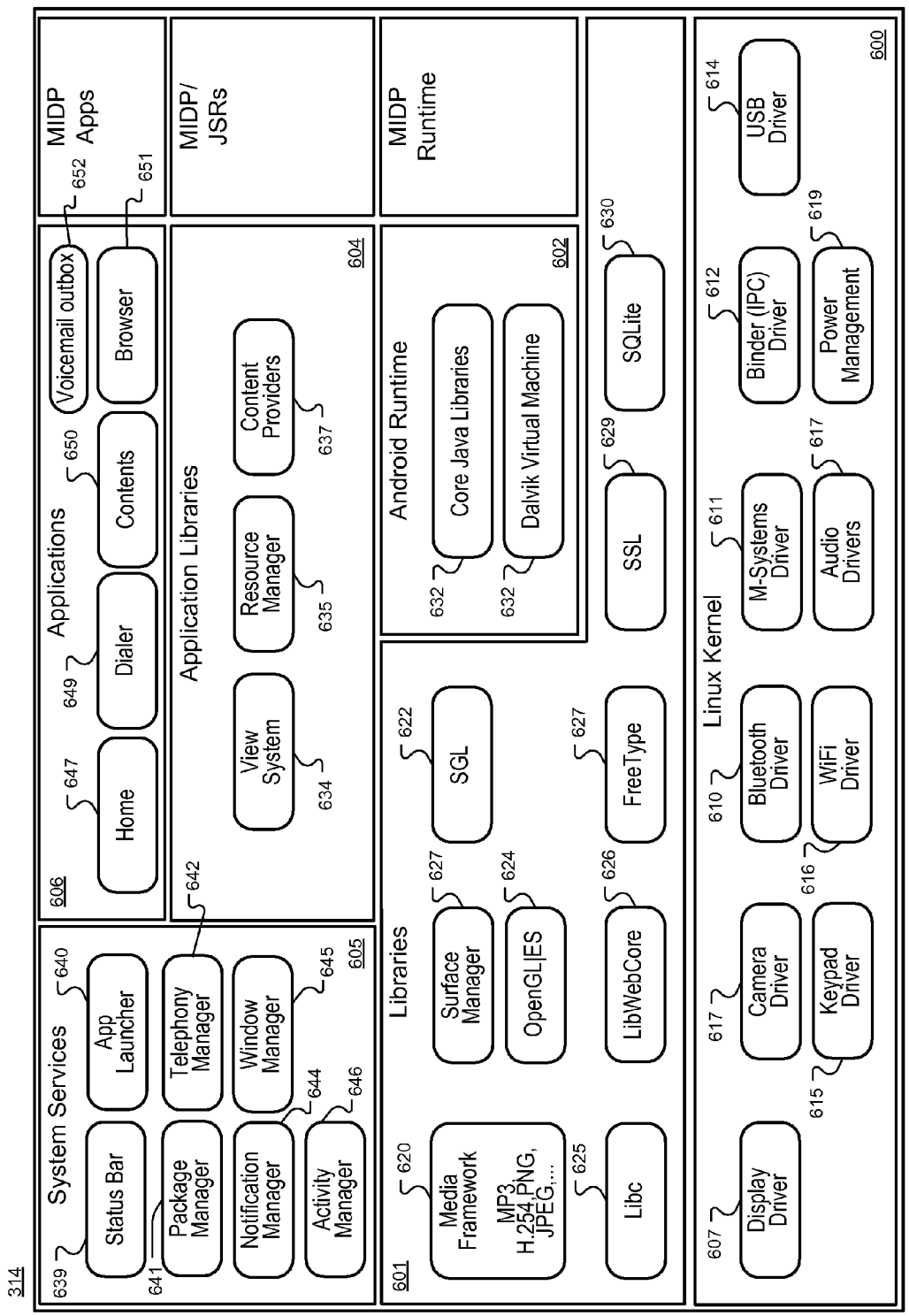
FIG. 6 is a block diagram illustrating exemplary components of the operating system used by the device of FIG. 4.

FIG. 6 is a block diagram illustrating exemplary components of the operating system 514 used by the device 400, in the case where the operating system 514 is the GOOGLE mobile device platform. The operating system 514 invokes multiple processes, while ensuring that the associated phone application is responsive, and that wayward applications do not cause a fault (or "crash") of the operating system. Using task switching, the operating system 514 allows for the switching of applications while on a telephone call, without losing the state of each associated application. The operating system 514 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 514 can generally be organized into six components: a kernel 600, libraries 601, an operating system runtime 602, application libraries 604, system services 605, and applications 606. The kernel 600 includes a display driver 607 that allows software such as the operating system 514 and the application programs 515 to interact with the display 401 via the display interface 502, a camera driver 609 that allows the software to interact with the camera 407; a BLUETOOTH driver 610; a M-Systems driver 611; a binder (IPC) driver 612, a USB driver 614 a keypad driver 615 that allows the software to interact with the keyboard 402 via the keyboard interface 504; a WiFi driver 616; audio drivers 617 that allow the software to interact with the microphone 409 and the speaker 410 via the sound interface 509; and a power management component 619 that allows the software to interact with and manage the power source 619.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 601 include a media framework 620 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 621; a simple graphics library (SGL) 622 for two-dimensional application drawing; an Open Graphics Library for Embedded Systems (OpenGL ES) 624 for gaming and three-dimensional rendering; a C standard library (LIBC) 625; a LIBWEBCORE library 626; a FreeType library 627; an SSL 629; and an SQLite library 630.

The operating system runtime 602 includes core JAVA libraries 631, and a Dalvik virtual machine 632. The Dalvik virtual machine 632 is a custom, virtual machine that runs a customized file format (.DEX).

The operating system 514 can also include Mobile Information Device Profile (MIDP) components such as the MIDP JAVA Specification Requests (JSRs) components, MIDP runtime, and MIDP applications as shown in FIG. 6. The MIDP components can support MIDP applications running on the device 400.

With regard to graphics rendering, a system-wide composer manages surfaces and a frame buffer and handles window transitions, using the OpenGL ES 624 and two-dimensional hardware accelerators for its compositions.

The Dalvik virtual machine 632 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 604 include a view system 634, a resource manager 635, and content providers 637. The system services 605 includes a status bar 639; an application launcher 640; a package manager 641 that maintains information for all installed applications; a telephony manager 642 that provides an application level JAVA interface to the telephony subsystem 520; a notification manager 644 that allows all applications access to the status bar and on-screen notifications; a window manager 645 that allows multiple applications with multiple windows to share the display 401; and an activity manager 646 that runs each application in a separate process, manages an application life cycle, and maintains a cross-application history.

The applications 606 include a home application 647, a dialer application 649, a contacts application 650, a browser application 651, and a voicemail outbox application 652.

The telephony manager 642 provides event notifications (such as phone state, network state, Subscriber Identity Module (SIM) status, or voicemail status), allows access to state information (such as network information, SIM information, or voicemail presence), initiates calls, and queries and controls the call state. The browser application 651 renders web pages in a full, desktop-like manager, including navigation functions. Furthermore, the browser application 651 allows single column, small screen rendering, and provides for the embedding of HTML views into other applications.

Figure 7:
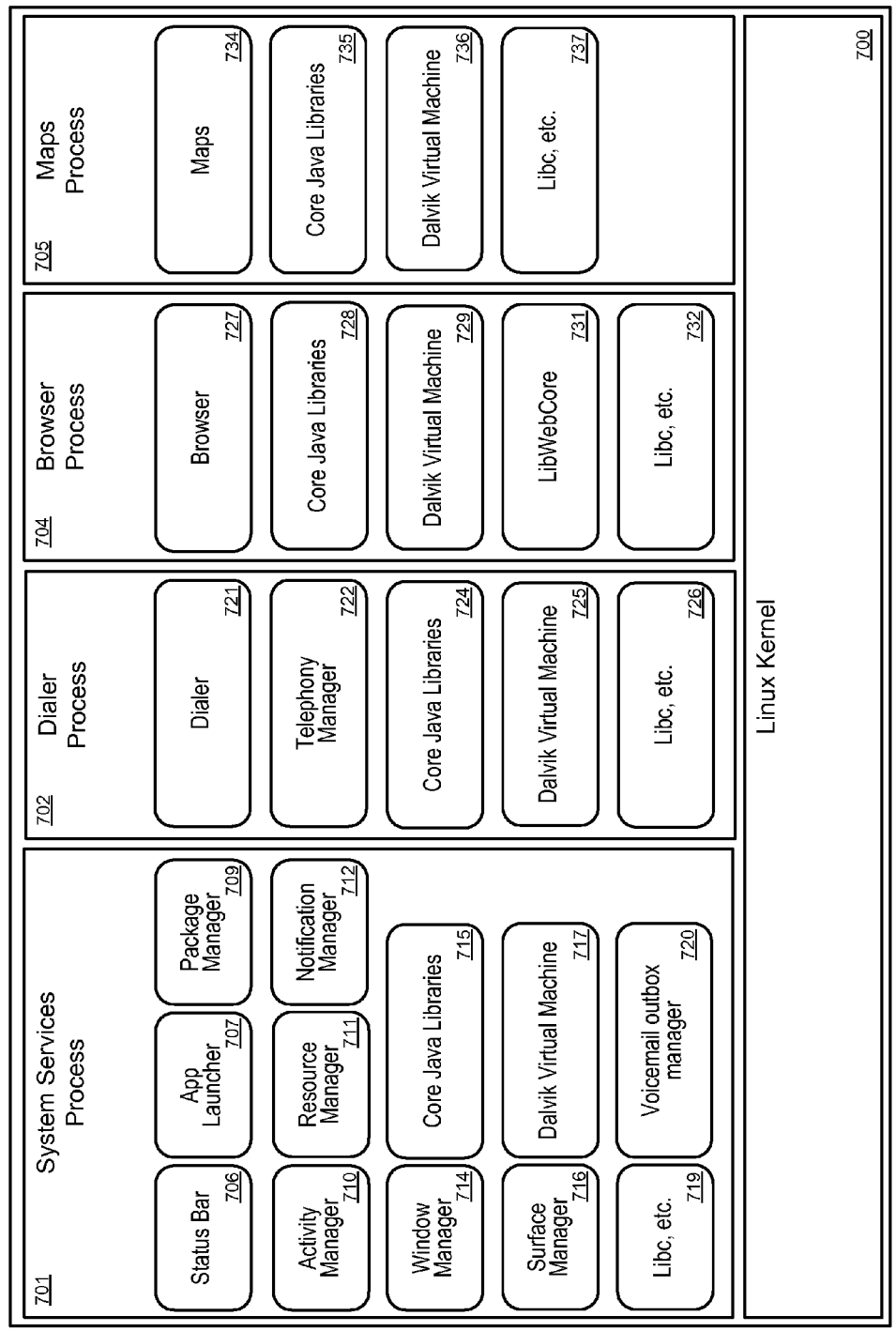
FIG. 7 is a block diagram illustrating exemplary processes implemented by the operating system kernel of FIG. 6.

FIG. 7 is a block diagram illustrating exemplary processes implemented by the operating system kernel 700. Generally, applications and system services run in separate processes, where the activity manager 646 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 716, the window manager 714, or the activity manager 710 can be continuously executed while the device 400 is powered. Additionally, some application-specific process can also be persistent. For example, processes associated with the dialer application 721, may also be persistent.

The processes implemented by the operating system kernel 700 may generally be categorized as system services processes 701, dialer processes 702, browser processes 704, and maps processes 705. The system services processes 701 include status bar processes 706 associated with the status bar 639; application launcher processes 707 associated with the application launcher 640; package manager processes 709 associated with the package manager 641; activity manager processes 710 associated with the activity manager 646; resource manager processes 711 associated with a resource manager 711 that provides access to graphics, localized strings, and XML layout descriptions; notification manger processes 712 associated with the notification manager 644; window manager processes 714 associated with the window manager 645; core JAVA libraries processes 715 associated with the core JAVA libraries 631; surface manager processes 716 associated with the surface manager 621; Dalvik virtual machine processes 717 associated with the Dalvik virtual machine 632, LIBC processes 719 associated with the LIBC library 625; and voicemail outbox manager processes 720 associated with the voicemail outbox application 652.

The dialer processes 702 include dialer application processes 721 associated with the dialer application 649; telephony manager processes 722 associated with the telephony manager 642; core JAVA libraries processes 724 associated with the core JAVA libraries 631; Dalvik virtual machine processes 725 associated with the Dalvik Virtual machine 632; and LIBC processes 726 associated with the LIBC library 625. The browser processes 704 include browser application processes 727 associated with the browser application 651; core JAVA libraries processes 729 associated with the core JAVA libraries 631; Dalvik virtual machine processes 730 associated with the Dalvik virtual machine 632; LIBWEBCORE processes 731 associated with the LIBWEBCORE library 626; and LIBC processes 732 associated with the LIBC library 625.

The maps processes 705 include maps application processes 734, core JAVA libraries processes 735, Dalvik virtual machine processes 736, and LIBC processes 737. Notably, some processes, such as the Dalvik virtual machine processes, may exist within one or more of the systems services processes 701, the dialer processes 702, the browser processes 704, and the maps processes 705.

Figure 8:
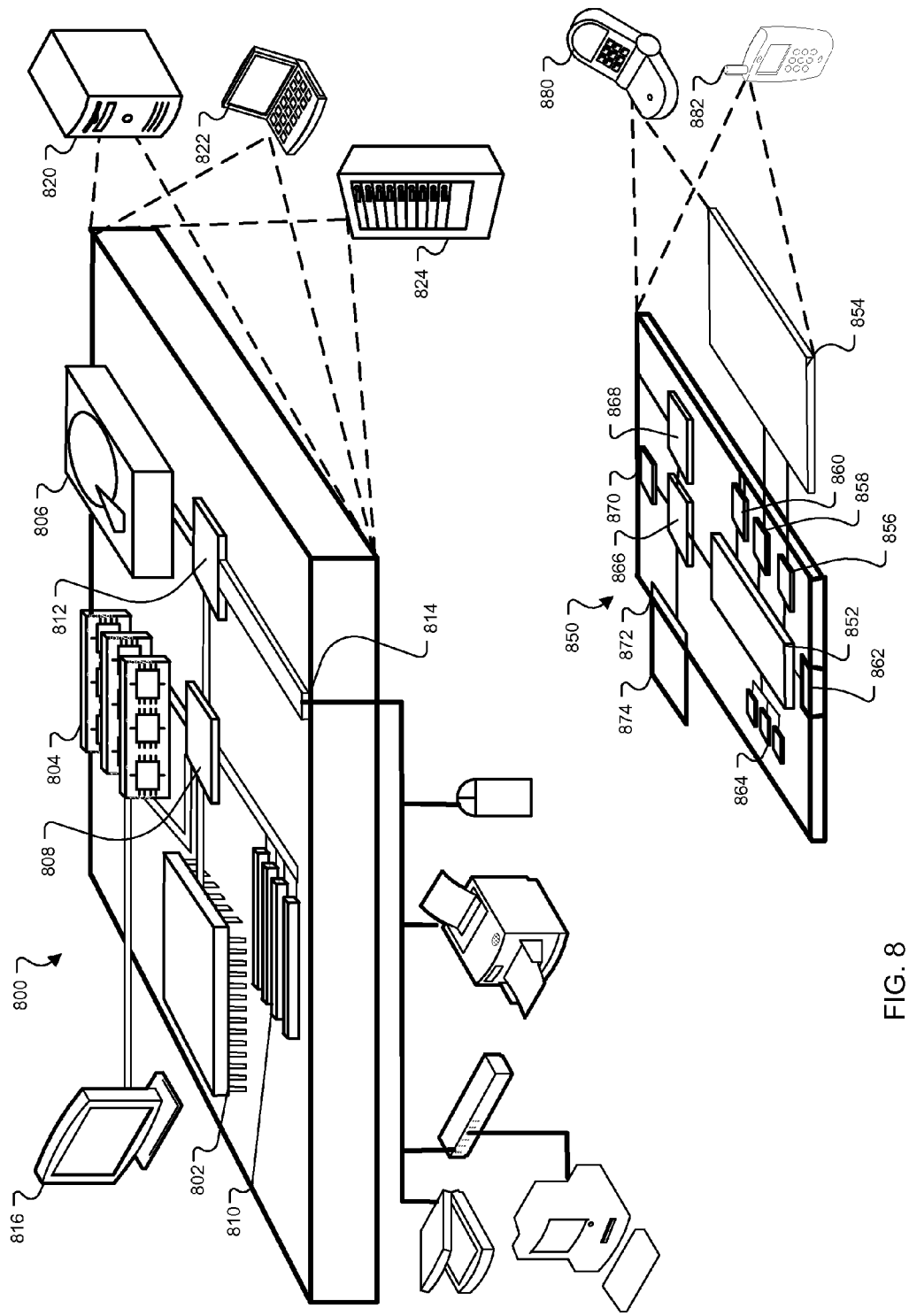
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, if an audio message is in a language different than the caller's primary language, the voicemail message can include a translation in the caller's primary language.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Although a few implementations have been described in detail above, other modifications are possible. Moreover, other mechanisms for storing a voicemail message in a caller's messaging outbox may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for processing voice messages, the method comprising:
   receiving a voicemail message from a first telephone user for a second telephone user;
   providing, for display in a messaging inbox of the second telephone user, the voicemail message or information used to retrieve the voicemail message;
   providing the voicemail message or information used to retrieve the voicemail message, for display in a messaging outbox of the first telephone user, wherein the messaging outbox is formatted to display to the first telephone user a plurality of messages sent by the first telephone user; and
   saving an audio file of the voicemail message at a central server, wherein information used to retrieve data from the inbox and information used to retrieve data from the outbox both point to the audio file.

2. The method of claim 1, further comprising receiving a selection of a user interface control in the messaging inbox, and providing an e-mail message to the second telephone user containing data automatically incorporated from the voicemail message.

3. The method of claim 2, wherein the data automatically incorporated from the voicemail message includes a computer-generated transcript of the voicemail message in a body of the e-mail message.

4. The method of claim 2, wherein the data automatically incorporated from the voicemail message includes an audio file of the voicemail message automatically attached to the e-mail message.

5. The method of claim 1, further comprising saving the audio file until both the first telephone user and the second telephone user have indicated an intent to delete the audio file.

6. The method of claim 1, further comprising generating data for displaying a plurality of outgoing messages for the first telephone user in a plurality of messaging modalities, in a single list of messages, wherein the messaging modalities include two or more modalities selected from a group consisting of e-mail, voice mail, text messages, and micro-blog posts.

7. The method of claim 1, further comprising identifying an e-mail address for the second telephone user by using a telephone number of the second telephone user, and automatically sending a follow-up e-mail message from the first telephone user to the second telephone user with the identified e-mail address.

8. The method of claim 7, further comprising receiving from the first telephone user a selection of an e-mail to the second telephone user and automatically dialing a telephone number for the second telephone user from only a selection of a dialing control, displayed with the e-mail message, by the first telephone user.

9. The method of claim 1, further comprising displaying a portion of the voicemail message.

10. The method of claim 1, further comprising an inbox and an outbox for every user in a private branch exchange network.

11. A voice messaging system, comprising:
- a personal information manager to store e-mail and telephone number information for a plurality of contacts;
- a voicemail manager to receive and store sent voicemail messages in a storage location that is accessible from voicemail outboxes associated with voicemail senders and from voicemail inboxes associated with voicemail recipients, wherein the voicemail manager maintains a particular copy of a voicemail audio file that is associated with a corresponding sent voicemail message and that is accessible both by a voicemail sender and a voicemail recipient; and
- a messaging manager to present to a user, interspersed in a single list, information about voicemail messages sent by the user along with information about e-mail messages sent by the user.

12. The system of claim 11, wherein the messaging manager is configured to receive a request from the user to forward a sent voicemail message, associate the sent voicemail message with an e-mail address of a voicemail recipient using the personal information manager, and forward the sent voicemail message in an e-mail message to the e-mail address.

13. The system of claim 11, further comprising a voice-to-text translation module programmed to generate a textual representation of a voicemail message and provide the textual representation to the messaging manager for display in a displayable message associated with the voicemail message.

14. The system of claim 11, wherein the messaging manager is programmed to generate display data for a plurality of outgoing messages in a plurality of messaging modalities, in a single list of messages, wherein the messaging modalities include two or more modalities selected from a group consisting of e-mail, voice mail, text messages, and micro-blog posts.

15. The system of claim 11, wherein the voicemail manager deletes the voicemail audio file only after both the voicemail sender and the voicemail recipient request deletion of the sent voicemail message.

16. The system of claim 11, wherein the messaging manager allows the user to search the sent voicemail messages that were sent by the user.

17. The system of claim 11, wherein the personal information manager sends an invitation to the voicemail sender to connect their messaging manager to the personal information manager and the voicemail manager.

18. The system of claim 11, wherein the messaging manager is configured to receive a selection from the voicemail sender to associate the voicemail with a folder.

19. A computer-implemented voice messaging system, comprising:
- a personal information manager to store e-mail and telephone number information for a plurality of contacts;
- a voicemail manager to receive and store sent voicemail messages in a storage location that is accessible from voicemail outboxes associated with voicemail senders and from voicemail inboxes associated with voicemail recipients, wherein the voicemail manager maintains a particular copy of a voicemail audio file that is associated with a corresponding sent voicemail message and is accessible by a voicemail sender and a voicemail recipient; and
- means for presenting to a user information about voicemail messages sent by the user along with information about other types of messages sent by the user.

20. The computer-implemented method of claim 1, further comprising causing to be displayed, in coordination with the messaging outbox, a user-selectable control that when selected, causes the voice mail message to be played audibly.

* * * * *